No. 633,109. Patented Sept. 19, 1899.
I. W. ALLEN.
BOOK.
(Application filed July 1, 1899.)

(No Model.)

Fig. 1.
Fig. 2.

Witnesses:
Inventor
Irving W. Allen.
By James J. Sheehy
Attorney

THE NORRIS PETERS CO., PHOTO-LITHO., WASHINGTON, D. C.

UNITED STATES PATENT OFFICE.

IRVING W. ALLEN, OF ST. JOSEPH, MICHIGAN.

BOOK.

SPECIFICATION forming part of Letters Patent No. 633,109, dated September 19, 1899.

Application filed July 1, 1899. Serial No. 722,569. (No model.)

*To all whom it may concern:*

Be it known that I, IRVING W. ALLEN, a citizen of the United States, residing at St. Joseph, in the county of Berrien and State of Michigan, have invented new and useful Improvements in Books, of which the following is a specification.

My invention relates to account or record books and contemplates the provision of a combined record and form book in which the alternate leaves are so perforated and are provided with such printed matter that, with the aid of an interposed carbon-sheet, four forms are filled by simply writing on the first leaf, three of which forms are calculated to be detached, while the fourth remains in the book and forms a permanent record.

The embodiment of the invention illustrated in the accompanying drawings is designed with a view of minimizing the labor incident to transmitting paper from one business-house to another for collection, preserving a record of the paper at the sending-house, entering the paper at the receiving-house, returning the proceeds to the sending-house, and entering the proceeds in the account of the customer for whom the collection was undertaken.

In the drawings, Figure 1 is a broken plan view illustrating the book in an open position with one of what I will, for convenience, term the "primary leaves" uppermost. Fig. 2 is a similar view with one of the secondary leaves, which alternate with the primary leaves, uppermost.

Referring by letter to the said drawings, A is a book, and B C are the primary and secondary leaves, respectively, thereof, the said leaves, of which there may be any number, being arranged alternately—that is to say, a secondary leaf after each primary leaf—for a purpose presently described.

The primary leaves are numbered consecutively, but are otherwise similar, and therefore a description of the leaf B shown will suffice to impart an understanding of all the primary leaves. Said leaf B embraces a short stub $a$, a slip $b$, which I will hereinafter term the "return" slip, and a slip $c$, which I will hereinafter term the "advice" slip. The return-slip $b$ is defined by two lines of perforations $d\ e$, which extend the full height of the leaf, and hence it will be seen that the slip $b$ and slip $c$ may together be disconnected from the stub $a$ and may also be readily disconnected from each other. On the slip $b$ is the printed matter shown, which embraces, among other things, a date-line $e^x$, lines $f\ g$ for the name of the customer in whose interest the collection is undertaken, and the inscriptions "Date of item," "Time," "Due," "Amount," "Interest," "Collected," "Exchange and collection," and "Proceeds," the same being arranged one below the other and followed by lines $h, i, j, k, l, m, n$, and $p$ to receive the amounts. On the advice-slip $c$ is the printed matter illustrated, which includes the name and address of the sending-bank, lines $q$ to receive the name and address of the party or bank to whom the paper is to be sent, a date-line $e^2$, a line $r$, followed by the word "Protest," the words "Maker or payer," and a space to receive his name, the words "Collections" and "Cash" at the heads of columns, the words "Amount" and "Interest," followed by lines $s\ t$, respectively, and the abbreviation "B. D. No.," followed by a line $u$. The slip $c$ also bears certain advice, which is shown in the drawings and need not therefore be mentioned herein.

The secondary leaves C are numbered consecutively, but are otherwise similar, and hence a description of the one shown will suffice to impart an understanding of all. Said leaf C embraces an inner section $v$, which is permanently secured in the book and is designed to contain a record, and a slip $w$, which I will hereinafter term the "memorandum-slip," the said slip $w$ being divided from the section $v$ by a line of perforations $x$, which extends the full height of the page. On the section $v$ of the leaf C is provided the printed matter shown, which, among other things, includes a date-line $e'$, arranged to rest directly under the line $e^x$ of leaf B, lines $f'\ g'$, arranged to rest directly under the lines $f\ g$ of leaf B, and the inscriptions "Date of item," "Time," "Due," "Amount," and "Interest," arranged one below the other and followed by lines $h', i', j', k'$, and $l'$, which are arranged so as to rest directly below the lines $h, i, j, k$, and $l$, respectively, of the leaf B. The section $v$ is also provided with a line $r'$, followed by the word "Protest," the words "Maker or payer" arranged above a space, and the abbreviation "B. D. No." followed by a line $u'$. As will be readily observed, the line $r'$ is arranged to rest directly under the line $r$ of leaf B, the space below the words "Maker or payer" is arranged to rest directly beneath the similar space of leaf B, and the line $u'$ is arranged to rest directly beneath the line $u$ of said leaf B. On the credit-slip $w$ of leaf C is provided the printed matter shown, which, among other things, embraces a date-line $e^3$, arranged to rest directly under the similar line $e^2$ of the slip $c$ of leaf B, the words "Amount" and "Interest" arranged to rest directly beneath the corresponding words of said slip $c$, and the words "Total," "Exchange," "Net," and "Date," arranged one above the other.

In using the book a carbon-paper or other duplicating medium (see Fig. 1) is interposed between the leaves B C with its face downward, and the entries are made on the leaf B and are reproduced by the carbon-paper in the proper places on the leaf C. With this done the leaf B as a whole is detached and forwarded with the paper to be collected. The advice-slip $c$ is retained by the recipient or receiving-bank, and the return-slip $b$, as its name implies, is returned to the sending house or bank after certain entries have been made upon it at the receiving house or bank.

The leaf C, as a whole, is retained in the book A at the sending-bank until the slip $b$ of leaf B is returned with the proceeds of the collection from the receiving-bank. When, however, the slip $b$ arrives at the sending-bank, the memorandum-slip $w$ of leaf C is completed and then detached and handed to the teller for credit to the account of the customer in whose interest the collection was undertaken. From this it follows that the presence or absence of the slip $w$ in the book indicates the status of the collection. The section $v$ of leaf C remains permanently in the book A and forms a record of the transaction.

A leaf B and a leaf C, with an interposed carbon-sheet, are employed to minimize the labor incident to the transmission of a paper from one bank to another for collection and the return of the proceeds to the sending-bank.

It will be appreciated from the foregoing that by employing an interposed carbon-sheet and writing on the leaf B four forms, no one of which is a duplicate of the other, are filled or partially filled. From this it follows that when the leaves B C are provided with printed matter other than that shown the book may be used to advantage by manufacturers and other business men.

Having thus described my invention, what I claim is—

The herein-described combined record and form book comprising primary leaves each of which embraces a stub and two slips detachably connected together and the inner one detachably connected to the stub, and secondary leaves arranged alternately with the primary leaves and each embracing an inner section of greater length than the inner detachable slips of the complementary primary leaf, permanently secured in the book and an outer slip detachably connected to said inner section; the inner and outer detachable slips of each primary leaf and the inner permanent section of each secondary leaf being provided with printed matter and lines arranged to register, and the outer detachable slip of each primary leaf and the detachable slip of each secondary leaf being also provided with printed matter and lines arranged to register, and said primary and secondary leaves being designed to be used in conjunction with a duplicating medium interposed between them, substantially as specified.

In testimony whereof I have hereunto set my hand in presence of two subscribing witnesses.

IRVING W. ALLEN.

Witnesses:
 LAWRENCE C. FYFE,
 G. M. THRESHER.